Jan. 26, 1943.  F. P. MILLER  2,309,409
ROTARY CUTTER
Filed March 4, 1941
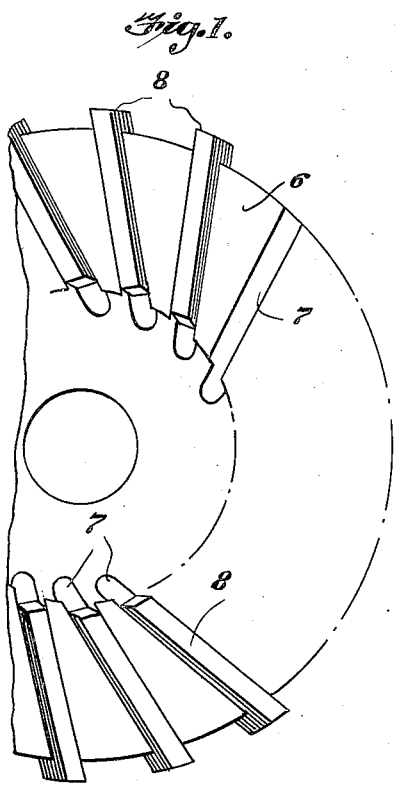
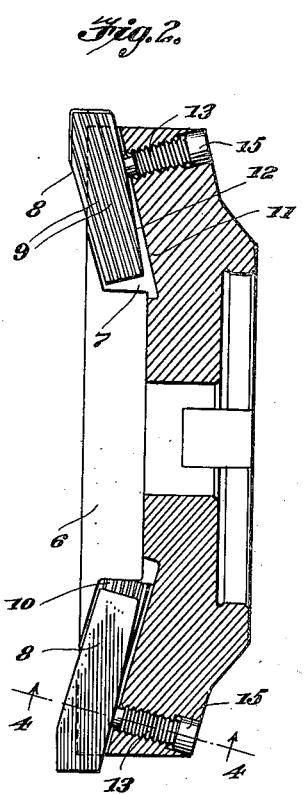
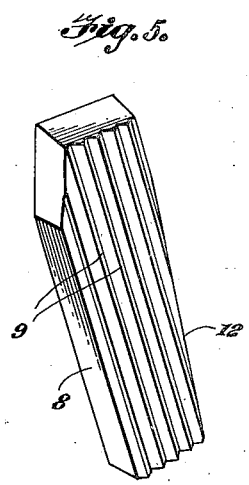
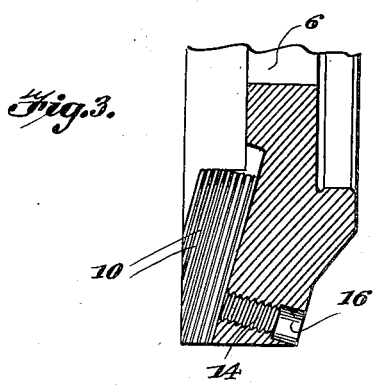
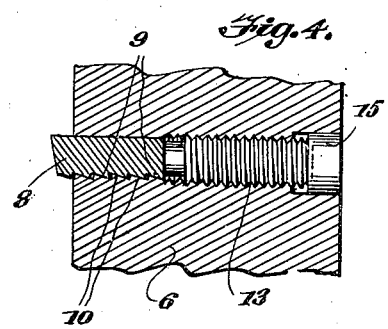
Inventor
FRANK P. MILLER
By
Attorney Patented Jan. 26, 1943

2,309,409

UNITED STATES PATENT OFFICE 2,309,409

ROTARY CUTTER

Frank P. Miller, Meadville, Pa.

Application March 4, 1941, Serial No. 381,755

9 Claims. (Cl. 29—105)

This invention relates to inserted blade cutters, especially of the face mill type, and particularly to means for locking and holding blades securely in positions of adjustment.

An object of the invention is to provide an improved blade locking means in which, at set positions of blade adjustment, the blade is held rigidly and positively against movement in the cutter body.

Another object is to provide improved blade holding means in which a blade locking screw is employed in cooperation with mating blade and holder slot serrations to effect a wedging action which securely locks an adjusted blade in position.

Other objects will be readily apparent to those skilled in the art.

In the accompanying drawing:

Figure 1 is a fragmentary front end elevation of a rotary cutter with blades positioned therein in the manner of this invention.

Figure 2 is substantially a vertical axial section therethrough illustrating details of the blade locking means;

Figure 3 is a fragmentary section of the cutter body, such as the lower portion of Figure 2, with blade and locking screw removed;

Figure 4 is a section taken on the line 4—4 of Figure 2;

Figure 5 is a perspective view of one of the cutter blades.

The present disclosure illustrates a specific application of the invention to rotary cutters known to the industry as ray-blade cutters. Such cutters are used for the most part in roughing cuts wherein the wear is primarily on the peripheral surface of the blade; and in which much more radial adjustment of a blade is required than axial adjustment. Obviously, however, the invention is equally applicable to any type of inserted blade cutter.

In the practice of the invention, a rotary cutter body 6 is provided at its front face and for a depth axially inward with a series of substantially radially disposed blade receiving slots 7 which mount the inserted blades 8. The longitudinal axis of each blade slot is inclined outwardly and forwardly with respect to the axis of the cutter body, and the slots are relatively long radially in order to provide for a much greater radial adjustment of the blades than axial.

The trailing face of each blade is provided over its longitudinal extent with parallel serrations 9 of the buttress type which mesh with complemental serrations 10 on the trailing wall of each slot, and the serrations of both blade and slot parallel the slot back wall 11; although, if desired, they may be otherwise arranged.

As shown best in Figure 5, a portion of the back edge 12 of each blade, extending from the blade bottom to a point spaced inwardly from the outer end of the blade a distance approximately equal to the length of its radial cutting edge, is inclined with respect to the longitudinal axis of the blade so that it diverges relative to the blade front edge. The blade serrations 9 and its front edge are parallel to the back wall 11 of the blade slot so that the angle of incidence between the cutter axis and the plane of the inclined edge portion 12 of each blade differs from that between the cutter axis and the plane of the blade front edge. In effect, the inclined edge 12 of the blade provides a taper thereon.

In back of each blade a heavy screw 13 is threaded through the cutter body to bear against the tapered edge portion 12 at right angles thereto. The screw socket 14 opens through the slot wall 11 at a point near the outer end thereof, which makes possible an engagement of screw and blade at any point over substantially the entire length of the blade, effecting great economy as the blade may be moved radially outward until the locking screw bears against the extreme inner end of the blade before blade replacement becomes necessary. The screw head 15, which has a suitable wrench socket, is countersunk in a receiving socket 16 formed as an enlargement of the screw socket and which is of sufficient axial extent to permit free travel of the screw along its axis to compensate the decrease in blade width as it is adjusted outwardly.

It will be apparent that the blade may be moved longitudinally of the serrations to effect its major adjustment radially of the cutter body. The inclination of the serrations relative to the cutter axis is such that as the blade is advanced radially outward it also moves slightly forward axially. When a set position of adjustment is obtained, the blade is firmly locked by advancing the screw 13 to bear tightly against the tapered blade edge 12. This movement forces the blade axially outward relative to the cutter body and brings the major inclined facets of the mating blade and slot wall serrations 9 and 10 into tight wedging engagement. The angle of the tapered portion 12 of the blade is such that the blade cannot shift radially inward in its slot over the engaged end of the locking screw; and the dovetailed and wedge effect of the blade and slot serrations coupled with the action of the locking screw effectively holds the blade rigidly against movement.

Adjustment is effected by loosening the screw 13 sufficiently to permit free sliding of the blade along the serrations, after which the locking screw is again tightened and the blade is locked in position.

The invention contemplates any arrangement of interfitting blade and slot wall serrations in which, under the thrust of the locking screw, a relative shifting of the serrations is effected in a direction other than longitudinally of the serrations, whereby the blade serrations ride up on the slot wall serrations to wedge the blade in position, rendering unnecessary the provision of separate wedge elements for blade locking.

I claim:

1. An inserted blade cutter comprising a rotatable body provided with a substantially radial blade receiving slot having a closed back wall, a blade in said slot, interfitting buttress-type serrations on a wall of the slot and the adjacent side face of the blade, said serrations extending longitudinally of the blade, and a locking screw bearing against the rear edge of said blade for forcing said interfitting buttress-type serrations into wedging engagement, the axis of said screw being substantially perpendicular to said serrations.

2. An inserted blade cutter comprising a rotatable body provided with a substantially radial blade receiving slot having a closed back wall inclined with reference to the cutter axis, a blade in said slot, interfitting buttress-type serrations on a wall of the slot and the adjacent side face of the blade, said serrations extending longitudinally of the blade parallel to the inclined back wall of the slot, and a locking screw threaded through the back wall of the slot into bearing contact with the rear edge of said blade for forcing said interfitting buttress-type serrations into wedging engagement.

3. An inserted blade cutter comprising a rotatable body having therein a substantially radial blade receiving slot with a closed back wall, a blade insertable in said slot for adjustment therein, interfitting buttress-type serrations on a wall of the slot and the adjacent side face of the blade, said serrations being parallel to the slot back wall, the rear edge of said blade having a portion tapered inwardly with reference to the longitudinal axis of the blade, and a locking screw threaded through the cutter body and operative through the back wall of the slot into engagement against said tapered rear edge portion of the blade.

4. An inserted blade cutter comprising a rotatable body having therein a substantially radial blade receiving slot with a closed back wall inclined with reference to the cutter axis, a blade insertable in the slot for adjustment therein, interfitting buttress-type serrations on the trailing side face of the blade and the trailing side wall of the slot, said serrations extending longitudinally of the blade parallel to the slot back wall, the rear edge of said blade having a portion diverging from the slot back wall toward the blade bottom, and a locking screw operative through the back wall of the slot into bearing engagement against the said diverging portion of the blade edge on an axis perpendicular to the plane of said diverging portion.

5. An inserted blade cutter comprising a rotatable body having therein a substantially radial blade receiving slot with a closed back wall inclined with reference to the cutter axis, a blade insertable in said slot for adjustment therein, interfitting serrations on a wall of the slot and a face of the blade, the rear edge of said blade having a portion tapered inwardly with reference to the longitudinal axis of the blade, a locking screw threaded through the cutter body and operative through the back wall of the slot into bearing engagement against the tapered rear edge portion of the blade, and the axis of said screw being perpendicular to the plane of said tapered portion of the blade.

6. An inserted blade cutter comprising a rotatable body having therein a substantially radial blade receiving slot with a closed back wall, a blade insertable in said slot for adjustment therein, interfitting serrations on a wall of the slot and a face of the blade, the rear edge of said blade having a portion tapered inwardly with reference to the longitudinal axis of the blade, and a locking screw threaded through the cutter body and operative through the back wall of the slot into bearing engagement against the tapered rear edge portion of the blade.

7. An inserted blade cutter comprising a rotatable body having therein a substantially radial blade receiving a slot with a closed back wall, a blade insertable in said slot for adjustment therein, cooperative wedge means on a side face of the blade and a wall of the slot resisting axially outward movement of the blade relative to the body, the rear edge of said blade having an outer portion parallel to the slot back wall and an inner portion divergently inclined relative to the slot back wall, and a locking screw threaded through the cutter body into bearing engagement against said inclined rear edge portion of the blade.

8. An inserted blade cutter comprising a rotatable body provided with a substantially radial blade receiving slot having a closed back wall, a blade in said slot, interfitting serrations on a wall of the slot and the adjacent side face of the blade, said serrations extending longitudinally of the blade, and a locking screw bearing against the rear edge of said blade for forcing said interfitting serrations into wedging engagement, the axis of said screw being substantially perpendicular to said serrations.

9. An insertable blade for cutters, comprising a blade body having an outer cutting edge and a forward cutting edge, parallel longitudinal buttress-type serrations on a side face of the blade, the rear edge of the blade having an outer portion parallel to said serrations, and the remainder of said rear edge being tapered inwardly toward the blade bottom at an angle across the serrations.

FRANK P. MILLER.